Jan. 7, 1947.  F. B. CARKHUFF  2,413,742
MILK STRAINER
Filed May 22, 1941  2 Sheets-Sheet 2

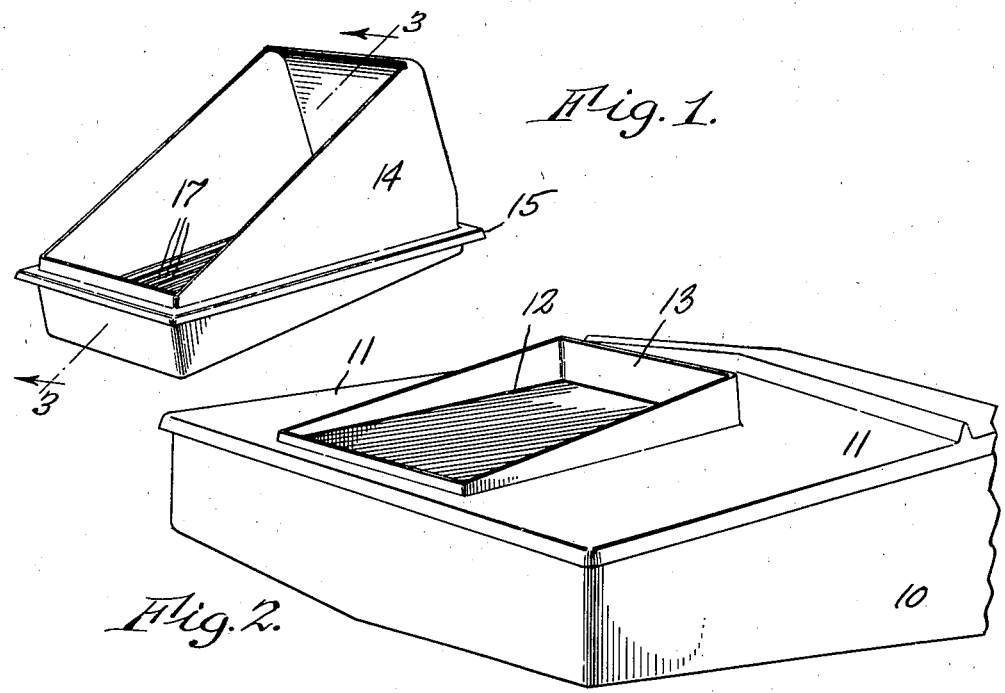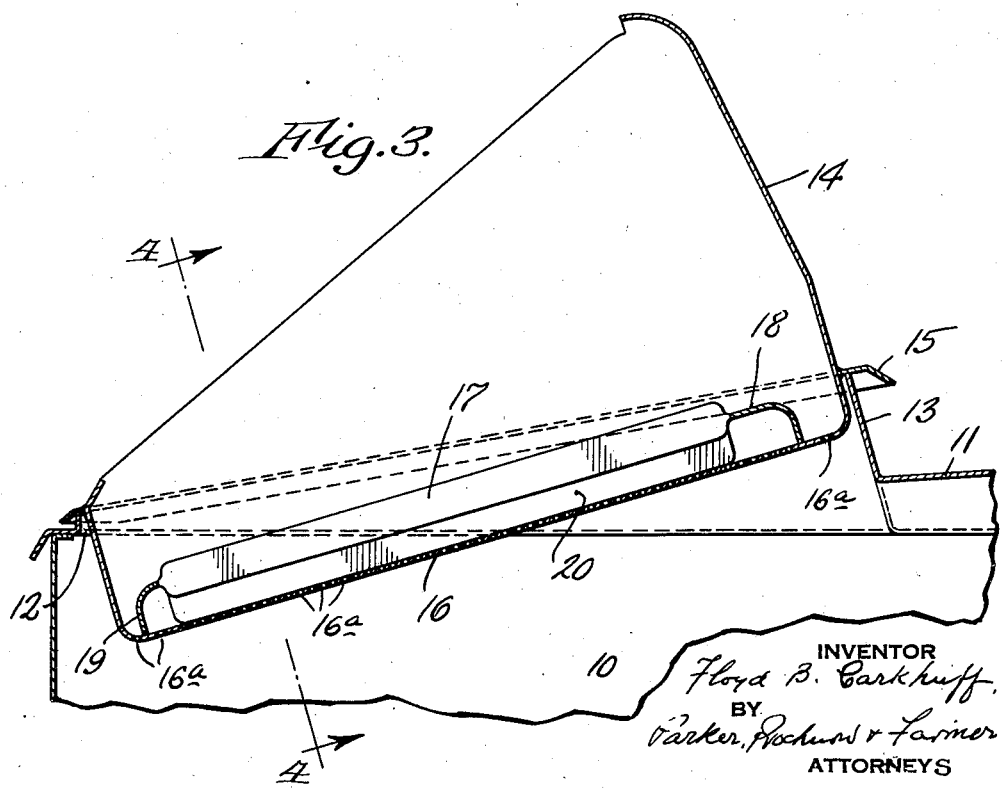

INVENTOR
Floyd B Carkhuff.
BY
Parker, Prochnow & Farmer
ATTORNEYS

Patented Jan. 7, 1947

2,413,742

UNITED STATES PATENT OFFICE 2,413,742

MILK STRAINER

Floyd B. Carkhuff, Binghamton, N. Y., assignor to Rice & Adams Corporation, Buffalo, N. Y.

Application May 22, 1941, Serial No. 394,578

8 Claims. (Cl. 210—155)

This invention relates to improved milk receiving devices, and in particular to receiving or weigh tanks equipped with strainers for use in milk receiving plants.

At milk receiving plants, milk collected from various farms is usually poured from cans into a receiving tank, where it is weighed and sampled, and the price paid a farmer for his milk is determined by the quality of that sample taken from the receiving tank.

In order that the sample of milk taken from the weigh or receiving tank be fairly representative of the entire body of milk, the milk poured from the various cans must be thoroughly mixed in the weigh tank. Otherwise the sample might contain more or less butter fat, for example, than the average of the body of milk in the tank, and the farmer in question would consequently receive a higher or lower price than he was entitled to. Provision for efficiently mixing the milk in preexisting weigh or receiving tanks has not been entirely satisfactory.

An object of this invention is to provide an improved milk receiving tank and strainer.

Another object of this invention is to provide an improved tank for receiving milk poured from cans and in which the milk will be strained and thoroughly mixed into a fairly homogeneous body without the aid of agitating impellers and the like, whereby a sample of milk taken therefrom will reasonably represent the entire body of milk in the tank.

Another object of this invention is to provide an improved strainer for a milk receiving tank, which will be easy to clean, which will prevent splashing of milk poured thereinto from cans, which will be simple and effective in operation and which will contribute to a thorough mixing of the milk in said tank.

Other objects and advantages will be apparent from the following description of one embodiment of the invention, and the novel features will be particularly pointed out hereinafter in connection with the appended claims.

In the accompanying drawings:

Fig. 1 is a perspective of a strainer constructed in accordance with this invention;

Fig. 2 is a perspective of a part of a milk receiving tank having an opening in the cover thereof for the insertion of the strainer shown in Fig. 1;

Fig. 3 is a sectional elevation of a strainer and a portion of a weigh tank, illustrating the manner in which the strainer is applied thereto, and taken approximately along the line 3—3, Fig. 1;

Figure 4:
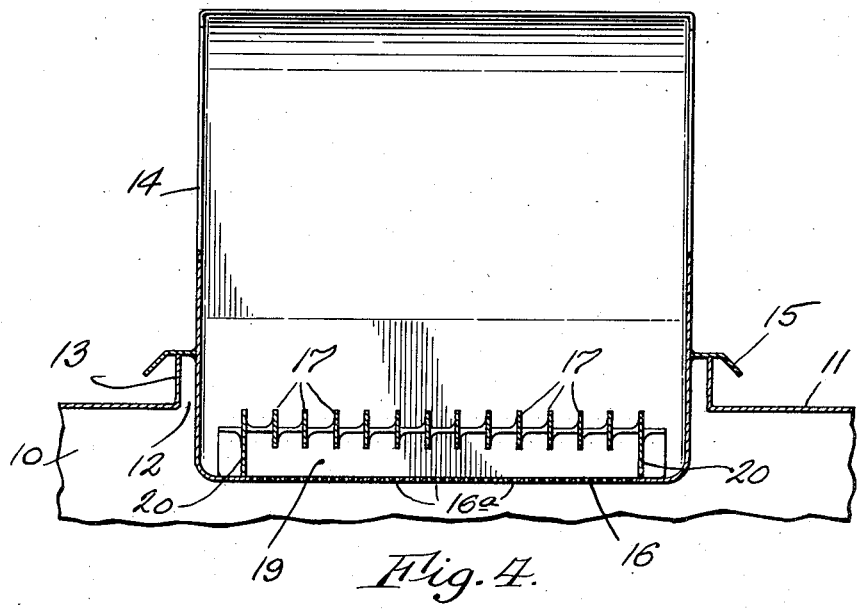
Fig. 4 is another sectional elevation of the weigh tank and strainer, taken approximately along the line 4—4, Fig. 3.

In accordance with this invention, a weigh or receiving tank 10 (Fig. 2) is supported in any suitable manner (not shown), and is provided with a removable cover 11. The cover 11 has an opening 12 adjacent one side thereof and facing upwardly, but spaced in a generally horizontal direction a substantial distance from the opposite side thereof, so as to be non-centrally disposed over said tank. Cans of milk brought into a milk plant or dairy in which such tank is located may be easily poured through the opening in the weigh tank by an attendant standing adjacent said side of the tank, or in some cases by suitable machinery. A flange 13 extends upwardly from the cover along the periphery of the opening 12 and preferably increases in height above the slightly crowned surface of the cover in a direction away from the side of said cover adjacent said opening. The flange 13 serves to support a strainer, which will be presently described. This tank is of the type commonly used in dairies and milk plants as a collecting receptacle into which cans of milk from various farmers are emptied. The milk from a given farm is poured into the tank where it is weighed (by means not shown), and a sample is taken therefrom. The sample is tested to determine the quality of the milk and the price to be paid therefor.

A somewhat tubular strainer 14 (Figs. 1 and 3) is inserted in the opening 12 and has an outwardly extending, peripheral flange 15, which engages the upper edge of the flange 13, and thereby supports the strainer. The strainer has a perforate sheet or strainer plate 16 extending across the bottom of the tubular passage therethrough which is operable to strain milk poured through said strainer passage and opening into said tank. This perforate sheet or plate may be made of relatively thin sheet metal such as 18 gauge steel, and the perforations 16a may be of any suitable size such as $\tfrac{1}{16}$ inch holes bored or punched in said plate. When so constructed, it operates very effectively to permit a rapid passage of the liquid through the strainer into the tank and yet efficiently removes many foreign particles from the milk.

The strainer plate 16 is mounted so as to be inclined at an angle with the horizontal upwardly and away from the near side of the cover 11. It is disposed or mounted substantially all above the maximum of expected level of the milk in the tank for purposes which will now be explained.

With previously used weigh tanks, in which the strainer plate has been horizontal, or in which the plate has been substantially submerged in the body of the milk in the tank, experience has shown that the milk poured therethrough into such a tank does not of itself mix efficiently and adequately with the body of the milk already in the tank to obtain a resultant, fairly homogeneous mixture. Apparently when the plate is submerged in the body of milk, the milk which is poured into the tank through the strainer merely settles into the body of liquid and does not circulate therein, but remains fixed in the spot in which it falls. Similarly, with a horizontal strainer plate disposed above the level of the liquid, the milk apparently falls vertically into the tank and causes very little agitation or motion of the milk body in the tank and remains more or less in the position in which it falls. Test samples taken from near the four corners and from the center of tanks provided with such submerged or horizontal strainer plates for straining milk poured thereinto, have not been homogeneous, but have varied over a relatively wide range with respect, for example, to butter fat content. The butter fat content of milk in different cans from the same source often varies considerably. Let us assume that such cans of milk from any particular farm are brought to the dairy and poured into such a weigh tank. A sample of the milk is taken from the tank and tested to determine the butter fat content, and the farmer is paid a price for his milk depending upon the butter fat content of that sample. Obviously, if that sample happens to have a higher butter fat content than the average of the entire body of milk in the tank, the dairy will pay the farmer more than his milk is worth. If, on the contrary, the sample taken should happen to have less than the average amount of butter fat in the entire body of milk, the farmer would be paid less than what he is entitled to and thereby unfairly deprived of an equitable price for his product.

I have found, however, that when the strainer plate is inclined at an angle to the horizontal and located substantially all above the maximum expected level of the milk in the weigh tank, the milk poured through the strainer into the tank is effectively mixed with the body of milk in the tank. Milk samples taken from the four corners and from the center of a weigh tank provided with an inclined strainer above the highest expected liquid level have been found to be substantially identical in quality or in butter fat content, so that the defects of the previously described type of strainer are very effectively remedied by this construction.

One theory of the operation of a strainer constructed in accordance with this invention is that a stream of milk passing through the strainer perforations or holes acquires a horizontal component of motion, in the direction of inclination of the plate, and that this motion serves to agitate and cause some circulation of the entire body of liquid in the tank instead of merely displacing enough liquid to make room for the entering milk. It is also believed that the milk which is poured from the said adjacent side of the cover would normally have a component of motion in a horizontal direction away from that edge of the cover and toward the center of the tank. Obviously, if the strainer plate were horizontal, the direction of horizontal motion of a stream of poured liquid would be opposed to some extent by the perforations in the horizontal plate which would tend to cause it to flow approximately vertically downward. If the plate is inclined, however, as in the present invention, the holes in the strainer plate will be more nearly alined with the direction of flow of the liquid poured away from the adjacent side of the tank, and the milk poured from the cans will, therefore, not lose its horizontal component of motion and will cause the above mentioned circulation and agitation of the entire body of liquid in the tank. In any event, I have found that a very efficient mixing of the liquid in the tank is obtained with an inclined strainer plate disposed substantially all above the expected level of the milk in the receiving tank.

Figure 5:
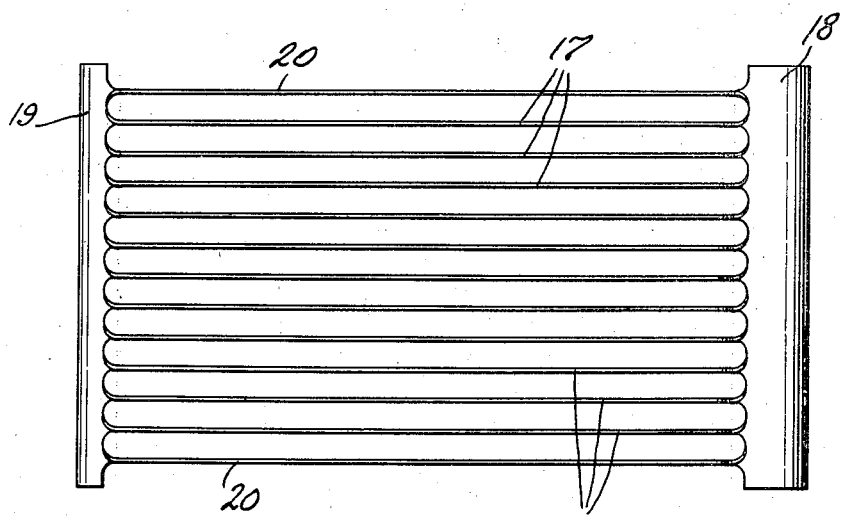
Fig. 5 is a plan view of the strainer grill which is effective to prevent splashing of milk poured into the strainer.

In order to prevent unnecessary splashing, the strainer is provided with a grill-like structure composed of substantially parallel bars 17 (Figs. 3, 4, and 5) extending lengthwise in the direction of inclination of the strainer plate 16 and adjacent thereto. These bars terminate at the upper and lower ends of the strainer plate in somewhat flange-like, imporforate baffles 18 and 19, which connect the adjacent ends of the bars, extend an appreciable distance beyond the connected ends of those bars in the general direction of the lengths of said bars and then depend into contact with said strainer plate substantially across said plate. In the illustrated embodiment, the baffle 18 at the upper edge of the plate is somewhat larger than the baffle at the lower edge of the plate, and forms together with the strainer plate a kind of a pocket which tends to oppose the flow of and trap milk poured from a can and flowing or deflected upwardly along said strainer plate. The liquid entering that pocket would, of course, tend to be forced through the perforations in the adjacent parts of the strainer plate, and splashing of the body of liquid rushing upwardly along said plate would thereby be materially reduced. Similarly, the lower baffle would tend to prevent splashing near the lower edge of the strainer plate, but since the milk would be poured from the side of the tank adjacent to the lower baffle and would tend to flow upwardly along the plate it is perhaps of less importance in preventing splashing.

It should be noted that the grill-like bars 17, together with the baffles 18 and 19, may be readily twisted from one integral piece of sheet metal. The bars preferably extend from edge to edge in a vertical direction and, with the exception of the two outer bars, and in a preferred embodiment of the invention, are disposed a short distance, such as approximately a half inch, above the strainer plate. The two outer bars 20 are somewhat wider than the others, and have lower edges extending along and in approximate contact with the strainer plate. These bars 20 operate somewhat like the baffles 18 and 19 previously described, and oppose the flow of milk which would tend to splash laterally against the adjacent side walls of the strainer. The intermediate bars 17, which in a preferred embodiment of the invention, are approximately one inch wide and spaced on one inch centers, operate to prevent substantially all splashing resulting from milk hitting directly on the strainer plate when such milk is poured from the milk cans into the strainer. The grill-like structure thus is a very neat and efficient mechanism for preventing objectionable splashing which might occur when milk is poured from milk cans through the tubular strainer into the tank.

The side walls defining the passage of the strainer (Figs. 1 and 3) preferably extend upwardly from the strainer plates to varying extents, the wall adjacent the side of the tank being relatively low so that milk cans may be easily emptied thereinto by an attendant without unnecessary lifting. These walls increase in height in a direction toward the opposite side of the strainer to prevent splashing of the milk out of the strainer, which would quite naturally tend to occur in that direction, due to the fact that the milk is poured from the cans in that direction. The side walls thus form an effective shield for preventing the splashing or overflow of any milk out of the strainer.

It is also noteworthy that the flange 15 (Figs. 1 and 3) is secured a considerable distance above the portion of the strainer plate that is adjacent the nearest side of the tank, but is inclined at a lesser angle with the horizontal than the strainer plate, so that the plane of the flange 15 and the plane of the strainer plate 16 converge toward one another in the direction of inclination thereof. As previously mentioned, the cover flange 13 also extends upwardly to various heights and supports the flange 15, and thereby the strainer. It will be obvious, therefore, that the two flanges 13 and 15 cooperate efficiently to support the strainer and strainer plate at the proper inclined angle without waste of space or materials. Moreover, the strainer can be readily lifted from the cover for cleaning, or for any other purpose, with a minimum of effort.

The tank and strainer are preferably made of stainless steel which will not corrode and may be easily cleaned, but other materials having suitable structural strength may be used. Altogether, it will be seen that this construction provides an extremely efficient receiving tank that can be kept sanitary under all conditions with a minimum effort, and in which the milk will be thoroughly mixed in a homogeneous body, so that samples for testing that are taken will be fairly representative of the entire body of milk.

It will be obvious that various other modifications of the details, materials and arrangements of parts which have been herein described and illustrated in order to explain the nature of the invention may be made by those skilled in the art within the principle and scope of the invention as expressed in the appended claims.

I claim as my invention:

1. In a tank of the type into which batches of milk are poured from cans and in which such milk is weighed and sampled, the improvement for straining the milk and increasing the homogeneity of the milk in said tank, which comprises said tank having an upwardly facing opening adjacent that side of said tank from which said cans are emptied into the tank, and a strainer disposed in said opening and through which the milk is poured into said tank from said cans, said strainer having substantially imperforate lateral walls defining an upwardly and downwardly opening passage, and also having a perforate strainer plate across said passage with substantially all of its perforate zone in close proximity to said opening so as to be disposed above the maximum expected level of milk in said tank, and inclined upwardly at a substantial angle with the horizontal in a direction away from said adjacent side of said tank, and a baffle disposed across the top of the perforate area of said plate closely adjacent the upper edge thereof, extending upwardly from adjacent said plate and then toward the opposite side of said passage, for obstructing the upward flow along said inclined plate of milk poured from said cans and deflected upwardly along the face of said plate.

2. In a tank of the type into which batches of milk are poured from cans and in which such milk is weighed and sampled, the improvement for straining the milk and increasing the homogeneity of the milk in said tank, which comprises said tank having an upwardly facing opening adjacent that side of said tank from which said cans are emptied into the tank, a strainer disposed in said opening and through which the milk is poured into said tank from said cans, said strainer having substantially imperforate lateral walls defining an upwardly and downwardly extending passage, and also having a perforate strainer plate across its passage substantially all at the top of said tank, and inclined upwardly at a substantial angle with the horizontal in a direction away from said adjacent side of said tank, a baffle of substantial vertical dimensions extending substantially across the top of said plate adjacent the upper edge thereof, another similar baffle extending across said plate adjacent the lower edge thereof, and a plurality of approximately parallel grill-like, anti-splash bars extending between and connecting the upper portions of said baffles adjacent to said plate.

3. In a tank of the type into which batches of milk are poured from cans and in which such milk is weighed and sampled, the improvement for straining the milk and increasing the homogeneity of the milk in said tank, which comprises said tank having an upwardly facing opening adjacent that side of said tank from which said cans are emptied into the tank, a strainer disposed in said opening and through which the milk is poured into said tank from said cans, said strainer having substantially imperforate lateral walls defining an upwardly and downwardly extending passage, and also having a perforate strainer plate across its passage, and inclined upwardly at a substantial angle with the horizontal in a direction away from said adjacent side of said tank and with its lowermost edge in close proximity to said opening, a baffle of substantial vertical dimensions extending substantially across said plate adjacent the upper edge thereof, another similar baffle extending across said plate adjacent the lower edge thereof, both of said plates extending upwardly from adjacent said plate and a plurality of approximately parallel grill-like, anti-splash bars extending between and connecting the upper portions of said baffles adjacent to said plate, the outer two of said bars depending into close proximity with said plate along substantially their entire length.

4. In a tank of the type into which batches of milk are poured from cans and in which such milk is weighed and sampled, the improvement for straining the milk and increasing the homogeneity of the milk in said tank, which comprises said tank having an upwardly facing opening adjacent that side of said tank from which said cans are emptied into the tank, a strainer disposed in said opening and through which the milk is poured into said tank from said cans, said strainer having substantially imperforate lateral walls defining an upwardly and downwardly extending passage, and also having a perforate strainer plate across its passage substantially all at approximately the top of the tank, and inclined upwardly at a substantial angle with the horizontal in a direction away from said adjacent side of said tank, and a grill of parallel spaced bars disposed above said plate with said bars extending in the direction of inclination of said plate, said grill having generally imperforate baffles of substantial vertical dimension at both ends of and extending crosswise of said bars, which baffles depend from the bars toward and approximately to said plate.

5. In a tank of the type into which batches of milk are poured from cans and in which such milk is weighed and sampled, the improvement for straining the milk and increasing the homogeneity of the milk in said tank, which comprises said tank having an upwardly facing opening adjacent that side of said tank from which said cans are emptied into the tank, and a strainer disposed in said opening and through which the milk is poured into said tank from said cans, said strainer having substantially imperforate lateral walls defining an upwardly and downwardly extending passage, and also having a perforate strainer plate across its passage and inclined upwardly at a substantial angle with the horizontal in a direction away from said adjacent side of said tank, with the lowermost end of said plate in close proximity to the top of said tank so that said plate will be substantially all above the maximum expected level of milk in said tank, and a grill of parallel spaced bars disposed above said plate with said bars extending in the direction of inclination of said plate and terminating at one end in a generally imperforate baffle of substantial transverse dimension which connects the adjacent ends of the bars, extends an appreciable distance beyond said connected ends of the bars in the general direction of the lengths of said bars, and then depends towards and approximately to said plate.

6. A strainer for a tank of the type into which batches of milk are directly poured from cans and in which such milk is sampled, which strainer comprises a tubular body having substantially imperforate lateral walls defining an upwardly and downwardly extending passage free of any substantial constrictions and having exteriorly exposed means, adjacent but spaced upwardly from the lower end of said passage, by which said strainer may be supported with such passage extending upwardly and downwardly, a plate extending across and closing the lower end of such passage, perforate over the major part of its face area and inclined upwardly at a substantial angle with the horizontal in a direction away from one side thereof when said body is supported with its passage extending generally vertically, whereby when said body is supported with said plate inclined upwardly, disposed above the maximum expected level of milk in said tank, and with the lower edge of the plate adjacent a side of said tank, the homogeneity of the milk in the tank will be increased by the direction of discharge of milk into the tank, and a grill of parallel, spaced bars disposed above said plate but in proximity thereto with said bars extending in the direction of inclination of said plate, said grill having baffles with substantial imperforate face areas at both ends of and extending crosswise of said bars, and which baffles extend from the bars towards and substantially to said plate.

7. A strainer for a tank of the type into which batches of milk are directly poured and in which such milk is sampled and which strainer comprises a tubular body having imperforate lateral walls defining a substantially unconstricted, ascending and descending passage and also having a plate extending across and closing the lower end of said passage, said plate being of relatively thin sheet metal and having straining perforations therethrough over the major part of its entire face area, said body having means closely adjacent the lower end of said passage by which it may be supported over said tank in a position with its passage running in a direction upwardly and downwardly, and with the perforate plate inclined upwardly, and with the plate substantially all at the top of said tank and above the maximum expected level of milk in said tank, whereby the direction of discharge of the milk through the plate will increase the homogeneity of the milk in the tank, and a grill of bars disposed above but in proximity to said plate and terminating adjacent the upper and lower inclined edges of said plate in generally imperforate baffles which depend toward and into close proximity to said plate.

8. A strainer for a tank of the type into which batches of milk are directly poured and in which such milk is sampled and which strainer comprises a tubular body having imperforate lateral walls defining a substantially unconstricted, ascending and descending passage and also having a plate extending across and closing the lower end of said passage, said plate being of relatively thin sheet metal and having straining perforations therethrough over the major part of its entire face area, said body having means closely adjacent the lower end of said passage by which it may be supported over said tank in a position with its passage running in a direction upwardly and downwardly, and with the perforate plate inclined upwardly, and with the plate substantially all at the top of said tank and above the maximum expected level of milk in said tank, whereby the direction of discharge of the milk through the plate will increase the homogeneity of the milk in the tank, and a grill of bars disposed above but in proximity to said plate and terminating adjacent the upper and lower inclined edges of said plate in generally imperforate baffles which depend toward and into close proximity to said plate, the bars along the inclined sides of the grill extending nearer to the perforate plate than the majority of the bars in the interior of the grill.

FLOYD B. CARKHUFF.